United States Patent [19]

Sigg

[11] 3,959,893

[45] June 1, 1976

[54] EDUCATIONAL GAMING APPARATUS

[76] Inventor: Theodore William Sigg, 601 S. Delphia, Park Ridge, Ill. 60068

[22] Filed: Sept. 19, 1975

[21] Appl. No.: 614,840

Related U.S. Application Data

[63] Continuation of Ser. No. 483,221, June 26, 1974, abandoned.

[52] U.S. Cl. .................................. 35/31 G; 35/70; 273/146
[51] Int. Cl.² ...................... G09B 19/02; A63F 9/04
[58] Field of Search .............. 35/31 G, 70; 273/146

[56] References Cited
UNITED STATES PATENTS

| | | | |
|---|---|---|---|
| 1,523,615 | 1/1925 | Stern | 273/146 |
| 2,077,010 | 4/1937 | Robertson | 372/146 |
| 2,839,844 | 6/1958 | Lehnkering | 35/31 G X |
| 3,204,345 | 9/1965 | Buckner | 35/70 X |
| 3,208,754 | 9/1965 | Sieve | 273/146 |
| 3,233,343 | 2/1966 | Short | 273/146 X |
| 3,314,168 | 4/1967 | Heckman | 35/31 G |
| 3,523,377 | 8/1970 | Gardner | 35/31 G |

Primary Examiner—William H. Grieb
Attorney, Agent, or Firm—Mann, Brown & McWilliams

[57] ABSTRACT

An educational gaming apparatus consisting of a set of numbered blocks, at least six in number and dodecahedron in shape, and a single operator block, also of dodecahedron configuration, each of the number blocks bearing one of the digits zero to nine on each of its faces with an unbiased distribution of the digits zero to nine on the set of numbered blocks, the operator block bearing one or more of the basic mathematical symbols of addition, subtraction, multiplication or division or their equivalent on each of its faces such that at least one of the basic mathematical symbols or their equivalent is present on an uppermost face section of the operator block for any random toss by an individual who can then arrange the blocks in such an order that the uppermost faces of the blocks indicate a mathematical problem and its solution.

9 Claims, 9 Drawing Figures

EDUCATIONAL GAMING APPARATUS

This is a continuation of patent application Ser. No. 483,221, filed June 26, 1974 now abandoned.

This invention relates to an educational gaming apparatus for use by one or more players, enabling the participants to engage in a game which is educational, instructional and amusing and will increase the ability of the players to quickly and easily deal with mathematical problems. The invention includes six number blocks and a single operator block all of which are adapted to be rolled by the various players, who may then arrange some or all of the number blocks and the operator block to indicate, on the uppermost faces of the blocks, a mathematical problem and solution. The object of the game is for an individual player to arrange the blocks he has rolled so as to maximize the numerical value of the answer.

Referring to the drawings in which a preferred embodiment of the invention is illustrated:

Figure 1A:
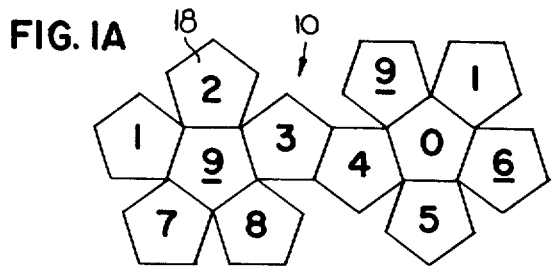
FIGS. 1A to 1F are developed schematic views of each of six different number blocks of the present invention.
Figure 1B:
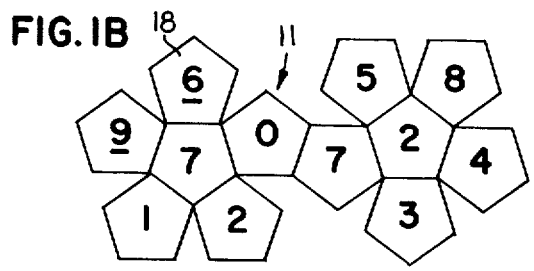
Figure 1C:
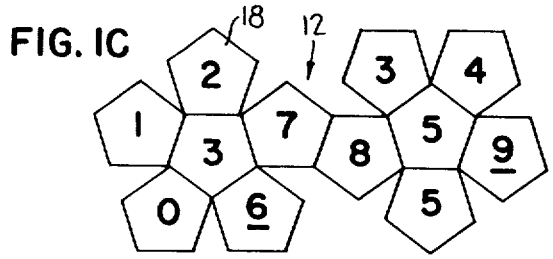
Figure 1D:
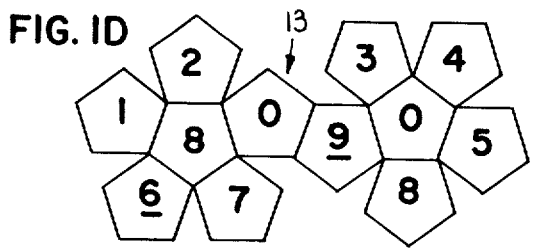

FIGS. 1A through 1F illustrate each of six number blocks of the present invention respectively numbered 10 through 15. The blocks are dodecahedron in configuration, having 12 face sections 18, pentagonal in shape, and of equal area. Each of the blocks 10 through 13 bear each of the numerals zero to nine on ten of the face sections 18. Two of the numerals are repeated on the blocks 10 through 13 of FIGS. 1A through 1D. Block 10 repeats the numbers nine and one. Block 11 repeats the numbers two and seven. Block 12 repeats the numbers five and three. Block 13 repeats the numbers zero and eight. Blocks 14 and 15, in addition to bearing each of the numerals zero to nine on ten of the face sections 18, repeat one number and, on one of the face sections, 19 and 20 respectively, bear a legend indicating a choice of numeral. Thus, block 14 bears the legend "EVEN CHOICE" on face section 19 indicating that the player may select any even digit. Block 14 repeats the number six. Block 15 bears the legend "ODD CHOICE" on face section 20 and repeats the number four.

Figure 1E:
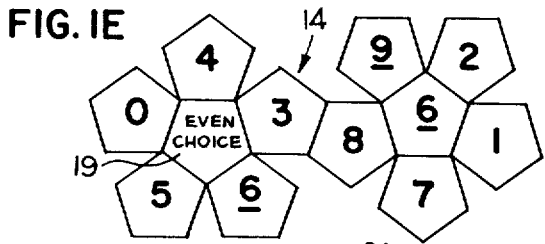
Figure 1F:
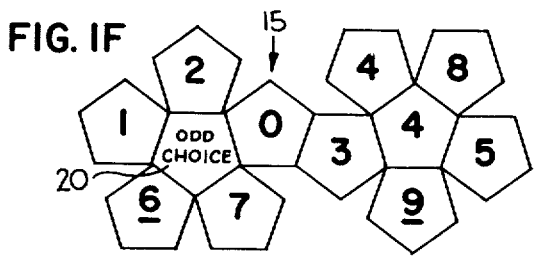
Figure 1G:
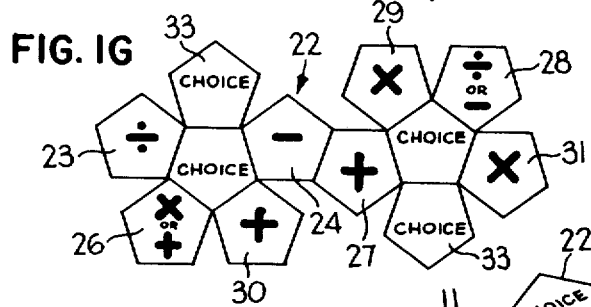
FIG. 1G is a developed schematic view of an operator block of the present invention.

FIG. 1G illustrates the operation block 22 being also dodecahedron in configuration similar to the number blocks 10 through 15. As indicated, the operation block 22 includes faces 23, 24, 27, 29, 30 and 31 which bear a single mathematical symbol as, for example, the division symbol on face section 23 and the subtraction symbol on face section 24. Two face sections 26 and 28 carry alternative mathematical symbols indicating to the player that he may choose either one or the other of the alternative mathematical operations indicated. The four remaining face sections 33 bear the legend "CHOICE" which indicates a choice of mathematical operations which the player may select as he desires.

The object of the educational gaming apparatus illustrated is to give the game players an opportunity to engage in a competitive exercise which relates to the basic mathematical operations of multiplication, division, addition and subtraction. It is felt that the presentation of such an exercise in game form presents an interesting and challenging opportunity to work with the basic mathematical operations. Playing of the game also requires familiarization with place value in the numerical system. The objective of the game is arrangement of a given set of numbers, subject to the restrictions of the operation block, to formulate a mathematical problem with the highest numerical value answer. The game can be played by one or any number of additional players.

Figure 2:
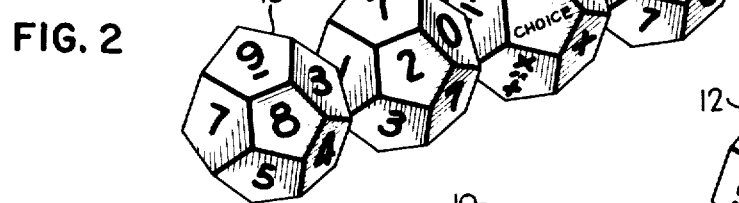
FIG. 2 is a perspective view of six of the blocks arranged to indicate a mathematical problem and solution.
Figure 2:
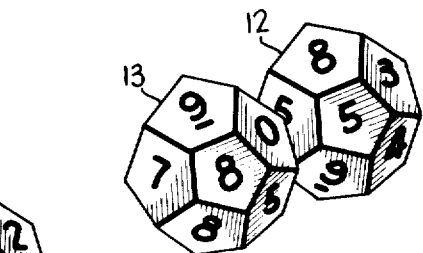
Figure 2:
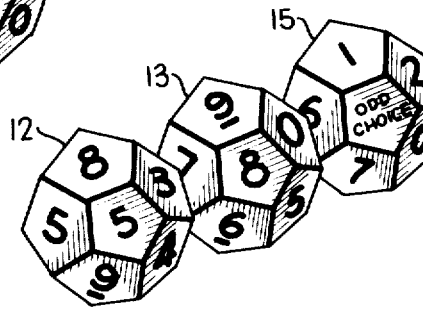
Figure 3:
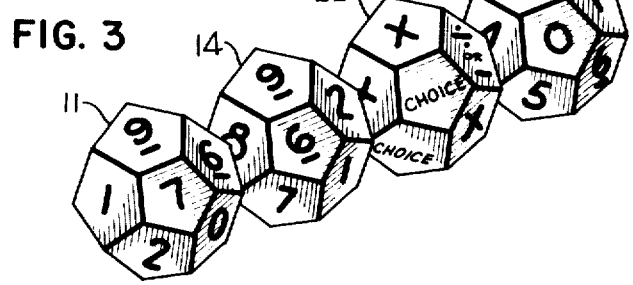
FIG. 3 is a perspective view of all seven of the blocks arranged to indicate a different mathematical problem and solution.

The playing and scoring of the game is as follows. Each player takes a turn at rolling all seven blocks at once. After his roll, that player must deal with the numbers and operation sign found on the top face of the blocks. He may use one or more of the number blocks 10 through 15 but must always use the operator block 22. The various blocks are then arranged to indicate a mathematical problem and a solution. FIG. 2 illustrates one arrangement utilizing five of the numbered blocks, 10, 11, 15, 13 and 12 and the operation block 22. The player has rolled the blocks to expose, on the uppermost face, the numbers 9, 7, 1, 9, 8 and one additional unselected number on the block 14. (Not Shown) The player has also exposed a "CHOICE" legend on the operation block 22. FIG. 2 illustrates one possible arrangement of the various blocks to indicate the mathamatical equation $97 + 1 = 98$. Other possible arrangements of the blocks of this same roll would include the mathematical equations $9 \times 9 = 81$; $8 + 1 = 9$; $7 + 1 = 8$; $9 + 8 = 17$, etc. The object of scoring in this game is to prepare a problem in which the solution has the highest numerical value. The answer to the problem is the number of points which are scored by a single individual, in this case 98. Thus, with all of the above possibilities, the problem and solution illustrated in FIG. 2 represents a score with the highest mathematical value for the given numbers and operation.

Since there are only six numbered blocks, no answer may ever exceed 891. Any of a number of rule variations may be employed for playing the game. One suggested set of rules provides for the players taking successive turns at rolling the blocks and arranging problems and solutions with each player receiving a score based upon his answer for each individual roll. The game is played until each player has had fifteen turns at which point the points accumulated by each player are totalled, the player having the highest number of points being the winner. The number of rounds of play may be shortened or lengthened as desired. It is also suggested that a time limit be placed on each player's turn.

Another method of scoring is the tally method in which the player having the highest numerical value answer after each round receive one tally mark. The player at the end of the game with the highest number of tally marks is declared the winner.

Playing of the game enhances, in the players, an appreciation of number place value of the numerical system and also makes the dealing in mathematical operations stimulating and enjoyable.

As illustrated the educational gaming apparatus of the present invention consists of six number blocks and a single operation block. The largest possible problem and answer would be $99 \times 9 = 891$. The smallest possible answer would be zero and can result in a player being unable to arrange a problem and answer subject to the operation block.

The construction and configuration of the game components is extremely important in order to arrive at a fair distribution of the digits zero to nine without biasing the game in favor of any particular digit. Any of the five regular hedrons may be used to form the game components with varying results. The tetrahedron, hexahedron, octahedron, dodecahedron and icosahedron are all possible configurations for the game blocks. To achieve a fair distribution of the numerals zero to nine, taken six at a time, exactly 60 face sections would be needed every time the blocks were rolled. The tetrahedron with four faces taken six at a time would allow only 24 faces for the digits zero to nine thus resulting in an imbalance of numerals. The hexahedron with six faces taken six at a time would present only 36 faces and again result in an imbalance of the numerals. The octahedron with eight faces taken six at a time would present 48 face sections and would again result in an imbalance of the numerals. The dodecahedron is the preferred structure in that it presents twelve faces taken six at a time resulting in 72 numbered face sections. The digits zero to nine, as illustrated in FIGS. 1A through 1F, all appear on each number block exactly once with two faces remaining on each number block. The two remaining faces multiplied by six blocks gives twelve additional faces. Of these faces, ten are again utilized by the numbers zero to nine leaving only two faces remaining. To place any single number on the remaining two faces would result in biasing the game in favor of those digits. Thus, as illustrated in FIGS. 1E and 1F, the remaining face sections 19 and 20 of blocks 14 and 15 bear the legends "EVEN CHOICE" and "ODD CHOICE" respectively. Accordingly, in the preferred embodiment of the invention, the ten digits zero to nine all appear exactly seven times on the 72 faces with one odd number choice and one even number choice thus resulting in a balanced distribution of the numbers zero to nine.

It has been found that an icosahedron with 20 faces taken six at a time allows 120 exposed face sections. Thus, each number could appear exactly twelve times. Accordingly an arrangement of the educational gaming apparatus of the present invention could be prepared using six number blocks and an operation block, each block being an icosahedron in configuration.

One preferred embodiment of the operation block is illustrated in FIG. 1G. This has been selected to bias the game in favor of an individual player being able to select a choice of mathematical operation. It is felt that such an arrangement allows for the various players to utilize their creative ability in playing the game. The choice of division or subtraction, indicated at face 28 of block 22 is intentionally grouped as are the choice of multiplication or addition alternatives of face 26 since they are inverse mathematical operations. It should be apparent that any of a number of adaptations of the operation block may be designed, however, only one block may be used at a time.

Each of the blocks of the gaming apparatus of the present invention could be constructed of a light flexible material such as, for example, molded plastics. Preferably, each of the blocks will be of a different color to prevent the mixing of similar blocks from different games.

Thus, it has been shown that an educational gaming apparatus has been provided including six numbered blocks and a single operator block which enables one or more players to participate in a competitive, educational, test of skill involving use of the various mathematical relationships.

The various features of the invention described herein are for illustrative purposes only. It is understood that the scope of the invention is not limited to the specific embodiments shown herein but rather is defined by the appended claims.

What is claimed is:

1. An educational gaming apparatus including:
   a set of at least six number blocks each having the configuration of a regular hedron, each number block having at least twelve face sections bearing a numeral or its equivalent on each of said face sections with an unbiased distribution of said numerals on said set of number blocks;
   a single operator block having the same configuration as said number blocks and having at least twelve face sections each bearing one or more of the basic mathematical symbols of addition, subtraction, multiplication or division or their equivalent such that at least one of said basic mathematical symbols or their equivalent is present on any uppermost face section of said operator block for any random position thereof;
   said apparatus adapted for random toss of said number blocks and said operator block by one or more players and adapted for arrangement of said blocks after said toss in an order such that uppermost face sections of selected number blocks and said operator block indicate a mathematical problem and solution.

2. An educational gaming apparatus as in claim 1 in which:
   said number blocks and said operator block are dodecahedron in configuration.

3. An educational gaming apparatus in claim 1 in which:
   said number blocks and said operator block are icosahedron in configuration.

4. An educational gaming apparatus as in claim 1 in which:
   all of the numerals zero through nine appear at least once on each of said number blocks.

5. An educational gaming apparatus as in claim 4 in which:
   none of said numerals appear more than twice.

6. An educational gaming apparatus as in claim 1 in which:
   at least one of said face sections of one of said number blocks bears a legend indicating choice of even or odd number.

7. An educational gaming apparatus as in claim 1 in which:
   at least one of said face sections of said operator block bears a legend indicating choice of operation.

8. An educational gaming apparatus as in claim 1 in which:
   at least one of said face sections of said operator block bears alternative mathematical symbols.

9. An educational gaming apparatus including:
   a set of six number blocks each block being dodecahedron in configuration, each number block having twelve face sections bearing a numeral or its equivalent thereon, one of said face sections of one of said number blocks bearing a legend indicating a choice of even numbers;

another of said face sections of one of said number blocks bearing a legend indicating a choice of odd numbers, said set of number blocks designed such that each of the numerals zero to nine appears at least once on each block and appears seven times on said set thereby providing an unbiased distribution of said numerals on said set of number blocks;

a single operator block dodecahedron in configuration having twelve face sections, some of said face sections bearing one or more basic mathematical symbols of addition, subtraction, multiplication or division thereon and at least one of said face sections bearing a legend indicating choice of symbols such that at least one of said basic mathematical symbols or choice thereof appears on an uppermost face section of said operator block for any random position of said operator block;

said apparatus adapted for random toss of said number blocks and said operator block by one or more players and adapted for arrangement of said blocks after said toss in an order such that uppermost face sections of selected number blocks and said operator block indicate a mathematical problem and solution.

\* \* \* \* \*